United States Patent [19]

Beber

[11] Patent Number: 4,729,414

[45] Date of Patent: Mar. 8, 1988

[54] ANIMAL WATER DISPENSING DEVICE

[76] Inventor: Emmanuel Beber, 2308 Dolores St., Pinole, Calif. 94564

[21] Appl. No.: 14,230

[22] Filed: Feb. 12, 1987

[51] Int. Cl.⁴ ............................................. B65B 3/04
[52] U.S. Cl. .................................. 141/250; 141/377; 141/392; 119/76
[58] Field of Search ............................ 141/250-284, 141/369-379, 392; 119/76, 75

[56] References Cited

U.S. PATENT DOCUMENTS

| 404,737 | 6/1889 | Schroeder | 119/76 |
| 610,707 | 9/1898 | Heckman | 119/76 |
| 657,164 | 9/1900 | Horton | 119/76 |
| 1,139,132 | 5/1915 | Maynard | 119/76 |
| 1,212,537 | 1/1917 | Millen | 119/76 |
| 2,580,041 | 12/1951 | Neilson | 141/377 |

Primary Examiner—Houston S. Bell
Attorney, Agent, or Firm—Bielen & Peterson

[57] ABSTRACT

A water dispensing device utilizing a trough which is fed by a faucet having a valve which controls the flow of water from a pressure source. A platform having first and second end portions is positioned adjacent the trough. One end of the platform is suspended above the ground surface. The valve of the faucet is regulated by movement of the second end portion of the platform in relation to the ground surface.

5 Claims, 3 Drawing Figures

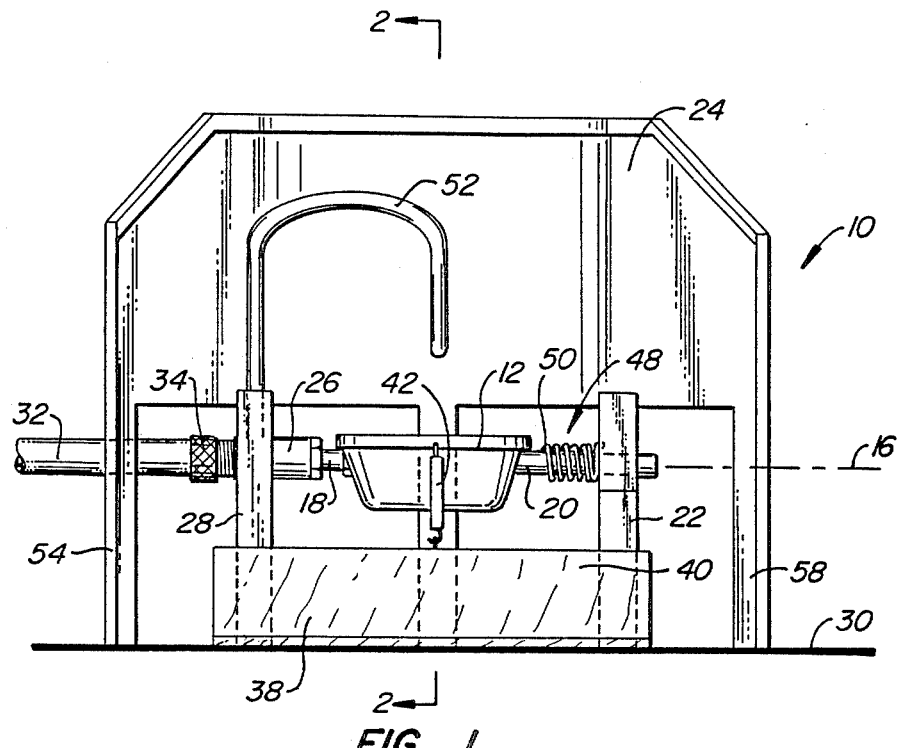
FIG._1.
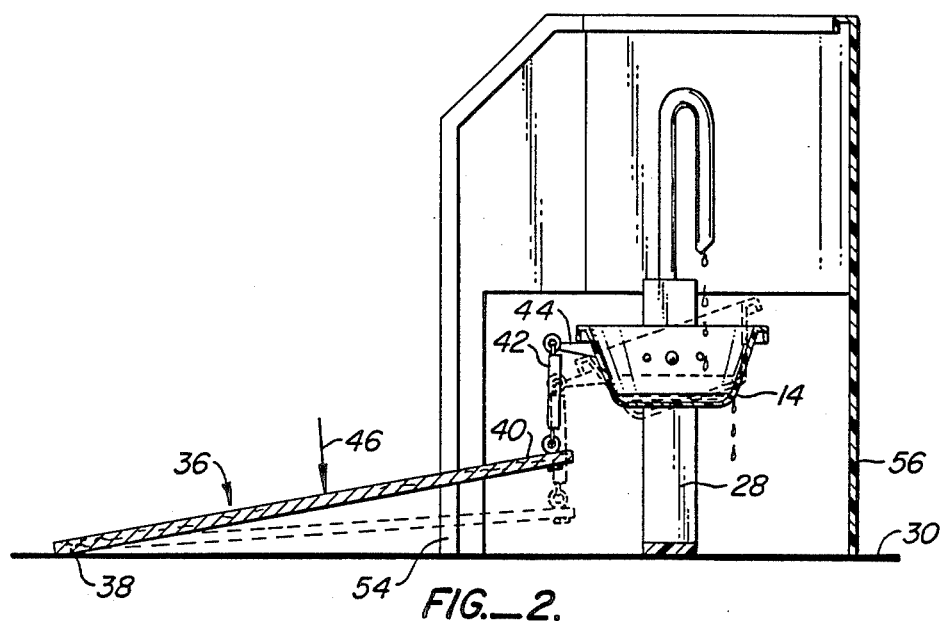
FIG._2.
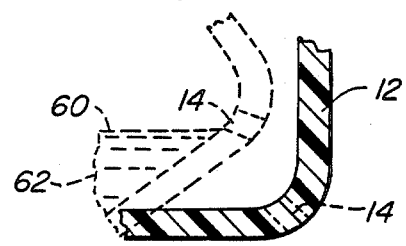
FIG._2A.

ANIMAL WATER DISPENSING DEVICE

CROSS REFERENCE TO RELATED INVENTIONS

The present invention is related to patent application Ser. No. 695,883 filed Mar. 15, 1985, now abandoned.

BACKGROUND OF THE INVENTION

A novel and useful water dispensing device is provided.

Pets and other animals require fresh water for survival. In the past, water has been provided to animals by occassionally filing a trough and then refilling the same when water has been consumed or otherwise expended. Watering in this fashion often creates a stagnant pool of water and requires the expenditure of labor to clean and refill the trough.

Other watering devices have been devised which include a tank of water which dispenses water to a trough until the tank has become empty. Tanks used with this system must be cleaned occasionally and often the water therewithin becomes stagnant unless chemically treated.

A device for dispensing water which continually provides fresh water to an animal would be a useful device in the field of animal husbandry.

SUMMARY OF THE INVENTION

In accordance with the present invention a novel device for dispensing water from a pressure source is provided.

The present invention utilizes a rotatable trough, bowl, or vessel for containing water, and a faucet which is connected to the pressure source of the water. The faucet directs water into the trough when the value of the faucet is open. The trough may include a drain opening such that water is retained in the trough for a limited amount of time and drains from the trough after the animal has drunk water from the trough.

The present device also encompasses the use of a platform having a first end portion and a second end portion. The second end portion of the platform is positioned adjacent the trough and is linked to the trough Application of force on the platform rotates the trough from a rest position about the axis in a first direction. This rotation also actuates the valve of the faucet such that water enters the trough.

Spring means also provided for rotating the trough in an opposite second direction upon removal of force on the platform. Thus, the trough returns to the rest position. In essence, the second end portion of the platform is capable of moving toward the ground surface with the application of force on the platform and returning to a position above the ground surface upon removal of that force. The first end portion of the platform may rest on the ground surface or on a structure gaining support therefrom.

The spring means may include a shaft connected to the valve and located along the trough axis. The trough is connected to the shaft for rotation therewith. The trough and shaft are mounted above the ground. A spring surrounding the shaft rotates the trough and shaft about the trough axis to the trough rest position. An enclosure may also be provided to restrict access to the trough.

The weight of an animal on the platform would therefore cause water to fill the trough adjacent the second end of the platform. The water would exit the trough through the drain opening after water consumption by the animal by the rotational force of the spring means.

It may be apparent that a novel and useful water dispensing device has been described.

It is therefore an object of the present invention to provide a device for dispensing water which automatically provides water into a trough only at the time the animal is in the near vicinity of the trough.

It is another object of the present invention to provide a device for dispensing which is relatively simple to construct, operate and repair.

It is another object of the present invention to provide a water dispensing device which may be operated by the animal without endangering the animal.

Further objective of the present invention is to provide a water dispensing device which prevents water stagnation and inhibits the spread of undesirable microorganisms thereby.

The invention possesses other objects and advantages especially as concerns particular characteristics and features thereof as the specification continues.

BRIEF DESCRIPTION OF THE DRAWINGS

FIG. 1 is a front elevation view of the device of the present invention.

FIG. 2 is a sectional view taken along line 2—2 of FIG. 1.

FIG. 2a is an enlarged section view of the trough wall portion having orifice 14 depicting the elevated position of the orifice in phantom.

For a better understanding of the invention reference is made to the following detailed description of the preferred embodiments of the invention which should be taken in conjunction with the hereinabove described drawings.

DESCRIPTION OF THE PREFERRED EMBODIMENTS

Various aspects of the present invention will evolve from the following detailed description of the preferred embodiments thereof which should be referenced to the hereindescribed drawings.

The invention as a whole is designated in the drawings by reference character 10. The water dispensing device 10 includes as one of its elements a trough 12 which is capable of holding a predetermined amount of water. Trough 12 may be constructed of any water impermeable material, such as plastic, and may also include a drain opening 14. Opening orifice 14, shown in FIG. 2A may be located in trough 12 as depicted. Trough 12 is rotatable about axis 16 from a rest position, shown in FIGS. 1 and 2, to a canted position shown in phantom in FIG. 2. Thus, opening 14 is elevated when trough 12 is so rotated. Such elevation permits water to gather in trough 12 when it is canted and to drain therefrom and return to its rest position.

Trough 12 is fixed to shafts 18 and 20 such that shafts 18 and 20 rotate with trough 12 about axis 16. Shaft 20 is connected to a post 22 which depends from shield 24. Shaft 20 would extend through post 22 and be rotatable relative thereto. A bearing could be placed within post 22 to engage the end of shaft 20 for this purpose (not shown).

Shaft 18 is also fixed to trough 12 and is rotatable about axis 16. Shaft 18 connects to a water valve 26 which is fixed to a post 28. Post 28 depends from shield 24 and extends to the ground surface 30 in the same manner as post 22. Valve 26 may be a Steedfex valve manufactured by Valve Corp. of Plano, Tex. Water is fed to valve 26 via hose 32 having male fitting 34 on the terminus thereof. Post 32 would, of course, be connected to a source of water pressure.

The present invention also includes a platform 36 having a first end portion 38 supported on ground surface 30 and a second end portion 40 which is fastened to removable link 42. Link 42 is itself connected to arm 40 which extends from trough 12. As shown in FIG. 2, pressure on platform 36 represented by directional arrow 46 causes second end portion 40 of platform 36 to move downwardly into tip or cant trough 12 (phantom rendition). Link 42 may be lengthened or shortened to accommodate weight, height, and other characteristics of the animal drinking at device 10. Also, the length of link 42 would determine the amount of water 62 available in trough 12 for consumption.

Spring means 48 biases the rotation of trough 12 and shafts 18 and 20 around axis 16. In other words, the removal of force from platform 36 actuates the rotational motivation of spring means 48. Spring means 48 includes a coil spring 50 which is connected to shaft 20 and to post 22.

Post 28 also serves as a support for faucet 52 which is controlled by valve 26. Faucet 52 serves as the spigot for water which enters trough 12. It should be apparent that faucet 52 is connected to valve 26, in this regard.

Shield 24 also includes posts 54, 56, and 58 which also rest on ground surface 30 and extend downwardly from shield 24. Shield 24 partially surrounds second end portion 40 of platform 36 such that an animal must travel on platform 36 to reach trough 12. Of course, shield 24 may be extended upwardly as necessary to prevent an animal from reaching over the top of shield 24 in order to reach trough 12.

In operation, the device 10 is placed on a ground surface 30 and hose 32 is connected to valve 36 in post 28. The animal desiring water travels up platform 36 and depresses second end portion 40 of platform 36. Trough 12, connected to platform 36 via link 42, is rotated about axis 16 at this time. Such rotation actuates valve 26 and causes water to exit faucet 52 and enter trough 12. Trough 12 fills to the level 60 determined by the elevation of orifice 14 therethrough FIG. 2A. After drinking the water 62, the animal would remove itself from platform 36 causing spring means 48 to rotate trough 12 to its rest position. At this point, water would drain through orifice 14 to empty the same.

While in the foregoing embodiments of the invention have been set forth in considerable detail for the purposes of making a complete disclosure of the invention it may be apparent to those of skill in the art that numerous changes may be made in such detail without departing from the principles of the invention.

What is claimed is:

1. A ground supported device for dispensing water from a pressure source thereof comprising:
  a. a trough, said trough rotatable about an axis;
  b. a faucet including a valve, said faucet being connected to the pressure source of water such that said valve is capable of controlling the flow of water therefrom, said faucet further including means for directing the flow of water into said trough, said trough being linked to said valve such that rotation of said trough actuates said valve;
  c. a platform having a first end portion and a second end portion, said second end portion of said platform being positioned adjacent said trough and being linked thereto such that application of force on said platform rotates said trough from a rest position about said axis in a first direction;
  d. spring means for rotating said trough in a second direction opposite said first direction upon the renewal of force on said platform, to return said trough to said rest position; and
  e. means for draining water from said trough, when said trough is in said rest position.

2. The device of claim 1 in which said means for draining water from said trough includes an opening through said trough, said trough opening being so located as to be elevated from its placement during said trough rest position, when said through is rotated about said axis.

3. The device of claim 2 in which said spring means includes a shaft connected to said valve and located along said axis, said shaft being connected to said trough for rotation therewith, means for mounting said trough and connected shaft above the ground, and, a spring surrounding said axis to rotate about said axis toward said trough rest position.

4. The device of claim 3 which additionally comprises an enclosure for restricting access to said trough.

5. The device of claim 4 which additionally comprises a removable link between said second end portion of said platform and said trough.

* * * * *